(12) United States Patent
Fujio et al.

(10) Patent No.: US 7,889,246 B2
(45) Date of Patent: Feb. 15, 2011

(54) PHOTOGRAPHING APPARATUS

(75) Inventors: Shigenori Fujio, Saitama (JP);
Toshihiro Hamamura, Tokyo (JP);
Takeshi Matsushita, Tokyo (JP)

(73) Assignee: Hoya Corporation, Tokyo (JP)

( * ) Notice: Subject to any disclaimer, the term of this patent is extended or adjusted under 35 U.S.C. 154(b) by 561 days.

(21) Appl. No.: 11/853,935

(22) Filed: Sep. 12, 2007

(65) Prior Publication Data
US 2008/0062284 A1    Mar. 13, 2008

(30) Foreign Application Priority Data
Sep. 13, 2006    (JP)    .............................. 2006-247781

(51) Int. Cl.
*H04N 5/235*    (2006.01)
*H04N 5/222*    (2006.01)
(52) U.S. Cl. .............................. 348/229.1; 348/333.02
(58) Field of Classification Search ........................ None
See application file for complete search history.

(56) References Cited

U.S. PATENT DOCUMENTS

| | | | |
|---|---|---|---|
| 5,913,086 A * | 6/1999 | Kawamura et al. | 396/223 |
| 7,539,405 B2 * | 5/2009 | Miyata | 396/79 |
| 7,561,201 B2 * | 7/2009 | Hong | 348/333.01 |
| 2004/0109083 A1 | 6/2004 | Fuchimukai | |
| 2004/0145673 A1 * | 7/2004 | Washisu | 348/364 |
| 2006/0045514 A1 * | 3/2006 | Matsushita et al. | 396/299 |
| 2006/0115260 A1 | 6/2006 | Nomura | |
| 2006/0146167 A1 * | 7/2006 | Aizawa et al. | 348/333.01 |

FOREIGN PATENT DOCUMENTS

JP    2006 222757    8/2006

OTHER PUBLICATIONS

English language Abstract of JP 2006-222757, 2006.
U.S. Appl. No. 11/853,863 to Hikari et al., which was filed Sep. 12, 2007.
U.S. Appl. No. 11/853,902 to Okamoto et al., which was filed Sep. 12, 2007.
U.S. Appl. No. 11/853,918 to Kanzaki, which was filed Sep. 12, 2007.
U.S. Appl .No. 11/853,984 to Hamamura, which was filed Sep. 12, 2007.

* cited by examiner

*Primary Examiner*—Sinh Tran
*Assistant Examiner*—Jason A Flohre
(74) *Attorney, Agent, or Firm*—Greenblum & Bernstein, P.L.C.

(57) ABSTRACT

A photographing apparatus comprises an operation unit, a controller, and a display unit. The operation unit has a range setting unit that is used for setting an upper limited value of a range of a sensitivity of an imaging sensor and a lower limited value of the range in a first sensitivity setting state where the sensitivity is calculated on the basis of a luminance value obtained in a photometric operation. The controller sets the upper limited value and the lower limited value corresponding to an operation of the range setting unit. The display unit displays an illustration of the upper limited value and the lower limited value that are set by the controller.

7 Claims, 7 Drawing Sheets

PHOTOGRAPHING APPARATUS

BACKGROUND OF THE INVENTION

1. Field of the Invention

The present invention relates to a photographing apparatus, and in particular to an apparatus where the range of a numerical value of an exposure condition can be changed.

2. Description of the Related Art

A photographing apparatus where the sensitivity of the imaging sensor is calculated to obtain a proper exposure based on a luminance value obtained in the photometric operation, is proposed.

Japanese unexamined patent publication (KOKAI) No. 2006-222757 discloses a photographing apparatus where the range of the sensitivity of the imaging sensor can be set by the user.

However, because setting the range of the numerical value of the exposure condition, such as the range of the sensitivity etc., is performed by using the operation key and the display unit, it is difficult to instantly visually verify the range of the numerical value from the display unit.

SUMMARY OF THE INVENTION

Therefore, an object of the present invention is to provide a photographing apparatus where the range of the numerical value of the exposure condition can be easily verified.

According to the present invention a photographing apparatus comprises an operation unit, a controller, and a display unit. The operation unit has a range setting unit that is used for setting an upper limited value of a range of a sensitivity of an imaging sensor and a lower limited value of the range in a first sensitivity setting state where the sensitivity is calculated on the basis of a luminance value obtained in a photometric operation. The controller sets the upper limited value and the lower limited value corresponding to an operation of the range setting unit. The display unit displays an illustration of the upper limited value and the lower limited value that are set by the controller.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
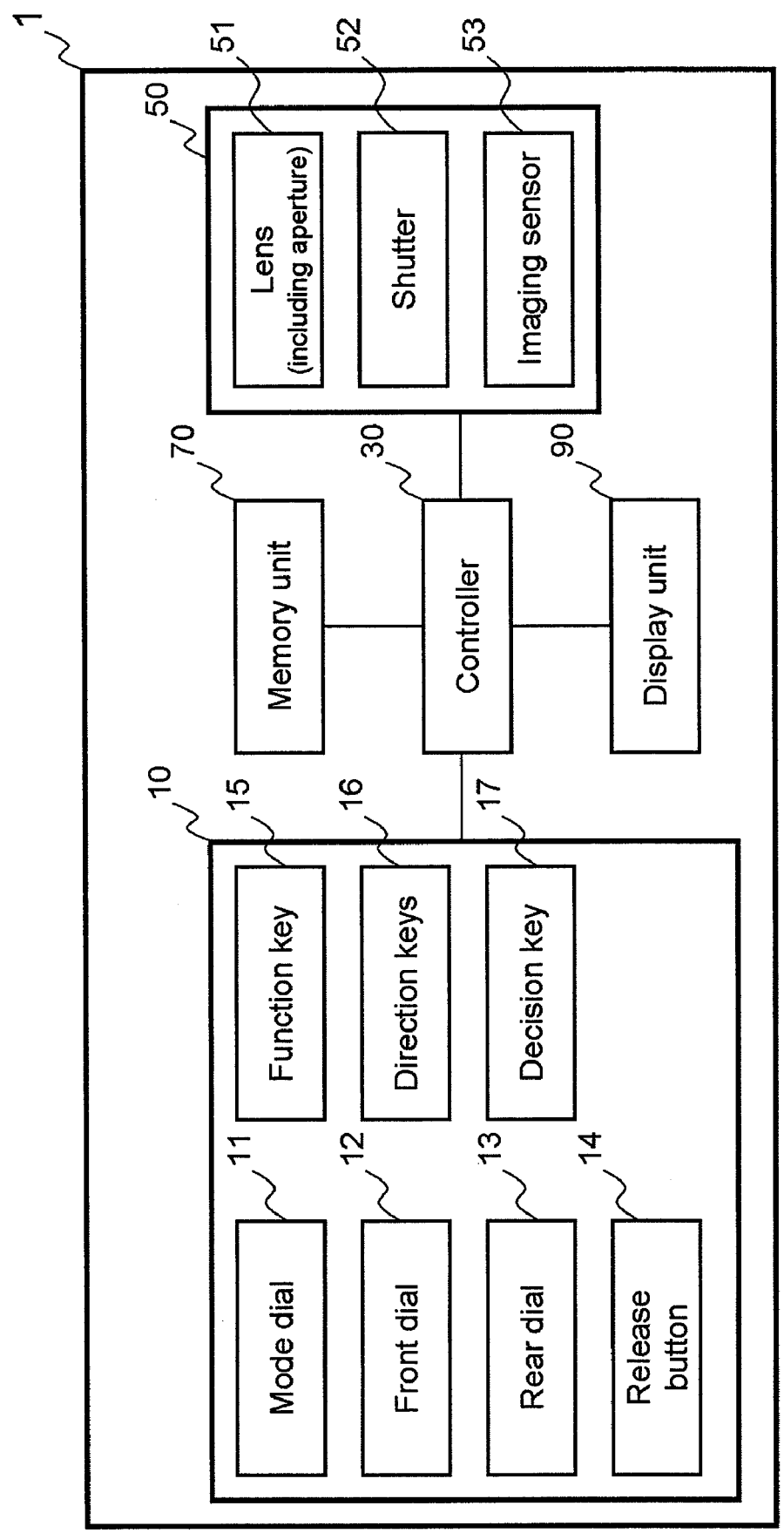
FIG. 1 is a block diagram of the photographing apparatus in the embodiment.

The present invention is described below with reference to the embodiment shown in the drawings. In this embodiment, the photographing apparatus 1 is a digital camera.

The imaging part of the photographing apparatus 1 comprises an operation unit 10, a controller 30, a photographing unit 50, a memory unit 70, and a display unit 90 (see FIG. 1).

Figure 2:
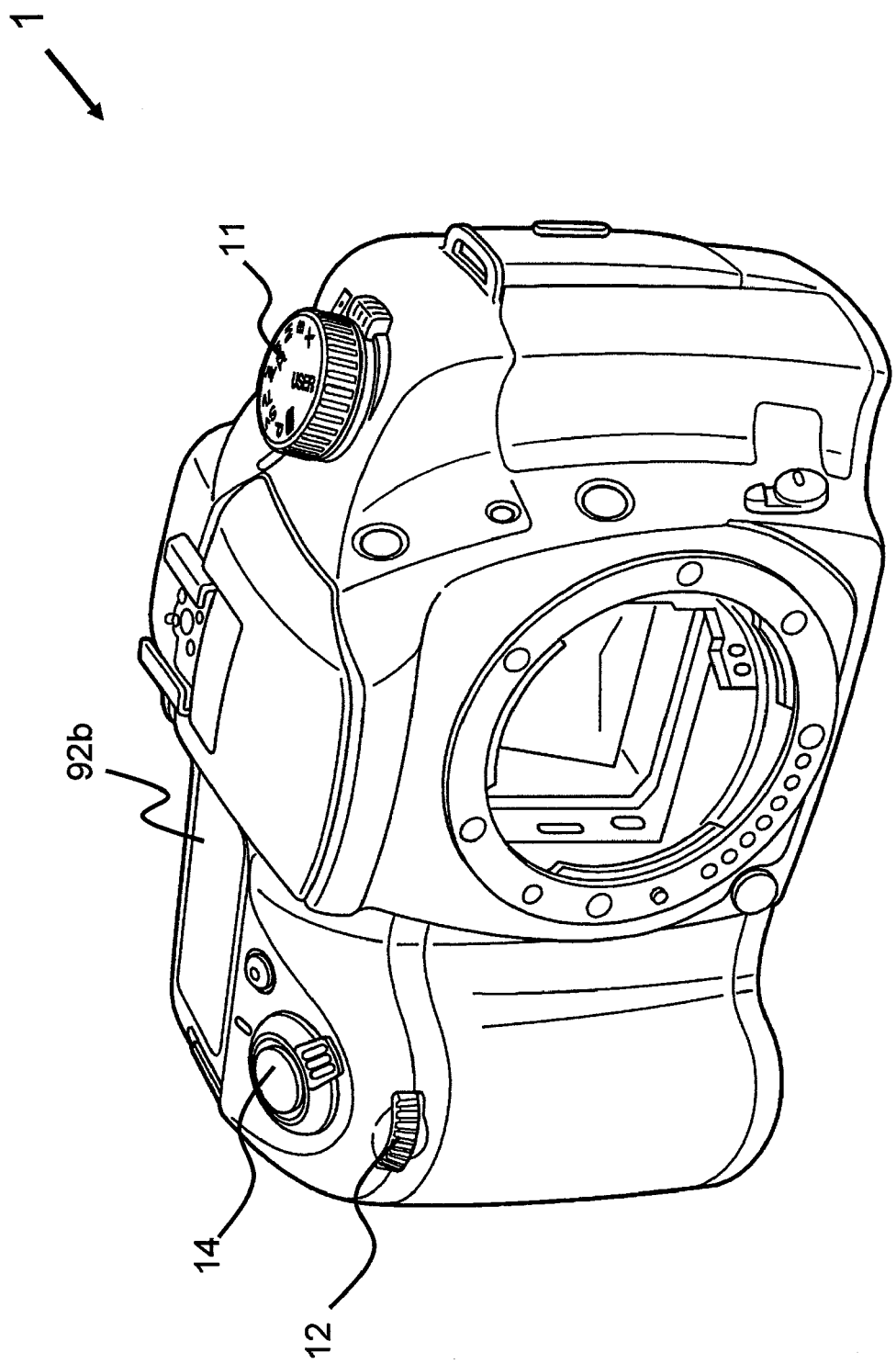
FIG. 2 is a perspective front view of the photographing apparatus.
Figure 3:
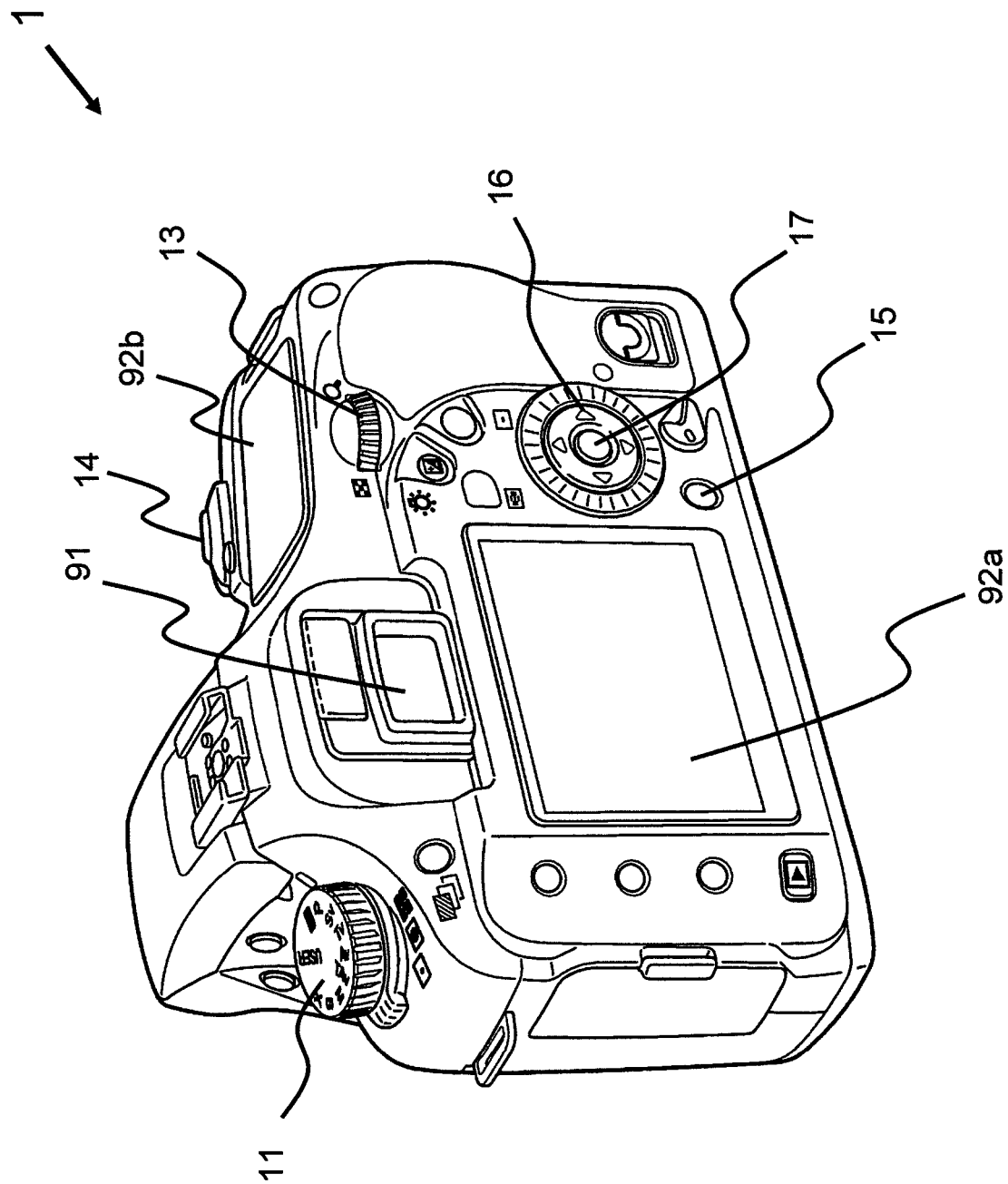
FIG. 3 is a perspective rear view of the photographing apparatus.

The operation unit 10 has a mode dial 11, a front dial 12, a rear dial 13, a release button 14, a function key 15, direction keys 16, and a decision key 17 (see FIGS. 1 to 3).

The photographing unit 50 has a lens 51 including an aperture, a shutter, 52, and an imaging sensor 53 such as a CCD etc.

The display unit 90 has an optical finder 91, a first display 92a, and a second display 92b.

In a photographing operation, the photographic subject image is captured as an optical image through the lens 51 and the shutter 52 by the imaging sensor 53 so that the image obtained by the photographing operation is displayed on the first display 92a and the image data obtained by the photographing operation is stored in the memory unit 70. The photographic subject image through the lens 51 can be optically observed by the optical finder 91.

The mode dial 11 is used for selecting the exposure mode, such as the aperture priority AE mode, the shutter speed priority AE mode, etc. The mode dial 11 is rotated so that the exposure mode corresponding to a mode mark on the mode dial 11 that is moved to a dial selection position (not depicted), by the rotating operation of the mode dial 11, is the exposure mode to which the photographing apparatus 1 is set.

The front dial 12 is an electric dial that is arranged on the front grip part of the photographing apparatus 1, whereby the front dial 12 can be rotated by the user's right forefinger, etc., while holding the photographing apparatus 1.

By rotating the front dial 12, the lower limited value of the range of the sensitivity of the imaging sensor 53 is set by the user.

However, the front dial 12 may be used for another adjusting operation, such as setting the EV compensation, setting the number of photographing operations in the auto bracket function, setting the shutter speed, etc.

When the front dial 12 is rotated in a positive direction (for example, in the clockwise direction when viewed from the top), the lower limited value of the range of sensitivity is increased.

When the front dial 12 is rotated in a negative direction (for example, in the counterclockwise direction when viewed from the top), the lower limited value of the range of sensitivity is decreased.

The rear dial 13 is an electric dial that is arranged on the right rear surface part of the photographing apparatus 1, whereby the rear dial 13 can be rotated by the user's right thumb, etc., while holding the photographing apparatus 1.

By rotating the rear dial 13, the upper limited value of the range of the sensitivity of the imaging sensor 53 is set by the user.

However, the rear dial 13 may be used for another adjusting operation, such as setting the step interval in the auto bracket function, setting the aperture value, etc.

When the rear dial 13 is rotated in a positive direction (for example, in the counterclockwise direction when viewed from the top), the upper limited value of the range of sensitivity is increased.

When the rear dial 13 is rotated in a negative direction (for example, in the clockwise direction when viewed from the top), the upper limited value of the range of sensitivity is decreased.

However, in the case that the lower limited value of the range of the sensitivity that is increased by the rotation of the front dial 12, is greater than the upper limited value of the range of the sensitivity at the point in time before the front dial 12 is rotated, the operation of the front dial 12 is invalidated by the controller 30.

Similarly, in the case that the upper limited value of the range of the sensitivity that is decreased by the rotation of the rear dial 13, is less than the lower limited value of the range of the sensitivity at the point in time before the rear dial 13 is rotated, the operation of the rear dial 13 is invalidated by the controller 30.

The range of the sensitivity of the imaging sensor 53 is the range of the sensitivity that the controller 30 limits in a first sensitivity setting state. In the first sensitivity setting state, the controller 30 calculates the sensitivity of the imaging sensor 53 on the basis of a luminance value, etc., of the photographing subject that is obtained in the photometric operation, in the limited range of the sensitivity.

Figure 5:
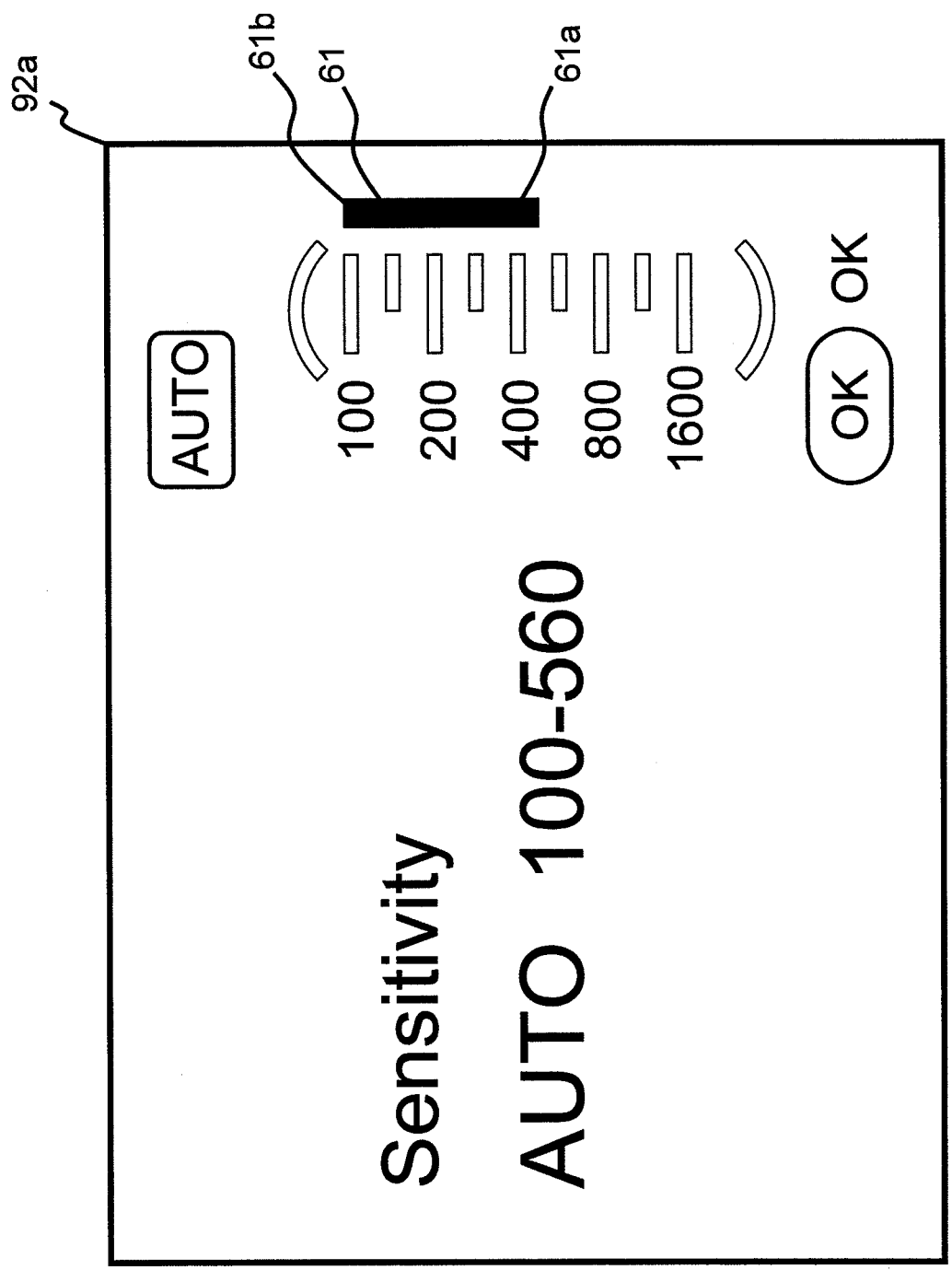
FIG. 5 shows display content that is displayed on the first display before the upper limited value of the range of the sensitivity is decreased.

For example, FIG. 5 shows the situation where the range of the sensitivity that is calculated is limited from ISO100 (the lower limited value) to ISO560 (the upper limited value), in the imaging sensor 53, whose range of sensitivity is from ISO100 to ISO 1600 (the entire range of sensitivity of the imaging sensor 53 is from ISO100 to ISO1600).

When the sensitivity of the imaging sensor 53 that is calculated, moves outside the limited range of sensitivity, an error message indication that the proper exposure can not be obtained is performed using an exposure condition indicating area (not depicted) in the optical finder 91 and the second display 92b etc.

When the release button 14 is partially depressed by the user, the photometric switch (not depicted) changes to the ON state so that the photometric operation by an AE sensor (not depicted), the AF sensing operation and the focusing operation by the AF sensor (not depicted) are performed.

When the release button 14 is fully depressed by the user, the release switch (not depicted) changes to the ON state so that the photographing operation is performed, and the image, which is captured, is displayed on the first display 92a, and the image data is stored in the memory unit 70.

The switching operation between a first sensitivity setting state and a second sensitivity setting state is performed by the user operating the function key 15, the direction keys 16, and the decision key 17, as the operation keys. In the first sensitivity setting state, the sensitivity is changeable in the limited range of the sensitivity, corresponding to the luminance value, etc. In the second sensitivity setting state, the sensitivity is set by the user and fixed regardless of the luminance value, etc.

Further, setting another function, such as a function regarding an image processing operation, or a storing operation of the image data, may be performed by operating these keys.

The function key 15 is arranged on the lower right rear surface of the photographing apparatus 1. The direction keys 16 includes a right direction key, a left direction key, an up direction key, and a down direction key and are arranged on the right rear surface of the photographing apparatus 1, where the direction keys 16 surround the decision key 17.

Figure 7:
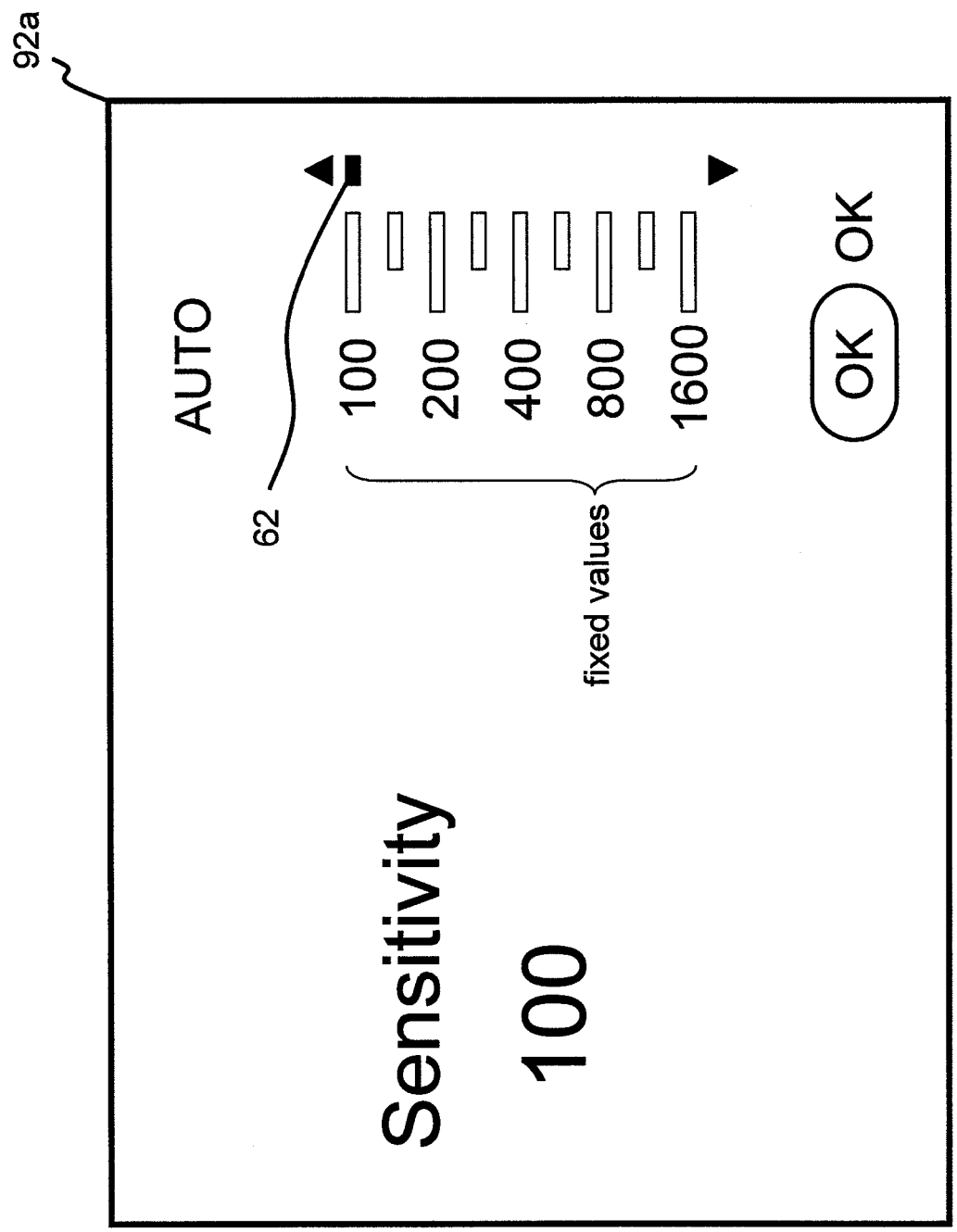
FIG. 7 shows display content that is displayed on the first display for setting the sensitivity.

The direction keys 16 are used for setting the sensitivity by the user in the second sensitivity setting state. For example, FIG. 7 shows the first display 92a, where a cursor is moved by operating the up key and the down key of the direction keys 16 so that the sensitivity of the imaging sensor 53 is set to ISO100 and fixed.

The decision key 17 is used for determining the upper limited value of the range of the sensitivity of the imaging sensor 53 that is set by the rear dial 13, the lower limited value of the range of the sensitivity of the imaging sensor 53 that is set by the front dial 12, and the sensitivity of the imaging sensor 53 that is set by the direction keys 16.

However, the upper limited value of the range of the sensitivity of the imaging sensor 53 that is set by the rear dial 13, the lower limited value of the range of the sensitivity of the imaging sensor 53 that is set by the front dial 12, and the sensitivity of the imaging sensor 53 that is set by the direction keys 16 may be determined by another method. For example, these may be determined when any key is not operated for a predetermined length of time.

The controller 30 is a control apparatus which controls each part of the photographing apparatus 1 regarding the photographing operation; in particular, the controller 30 sets the function corresponding to the operation of the operation unit 10 and displays information regarding setting the sensitivity on the display unit 90, when the sensitivity of the imaging sensor 53 is set.

The optical finder 91 is a finder that is used for observing the optical image of the photographing subject through the lens 51 and for observing the exposure condition as set by the user or calculated by the photometric operation, with one of the user's eyes.

The first display 92a is an indicating apparatus that is arranged on the rear surface of the photographing apparatus 1 and displays the image obtained by the photographing operation and the information regarding setting the sensitivity of the imaging sensor 53.

The second display 92b is an indicating apparatus that is arranged on the top surface of the photographing apparatus 1 and displays the information about the function that is set, regarding the exposure condition, the image processing operation such as the white balance etc., and the storing operation.

The first display 92a displays a sensitivity setting picture that shows the information regarding setting the sensitivity of the imaging sensor 53 (see FIGS. 5 to 7), by operating the function key 15, the direction keys 16, and the decision key 17.

When the front dial 12 is rotated under the condition where a first sensitivity setting picture corresponding to the first sensitivity setting state is displayed on the first display 92a, the lower limited value of the range of the sensitivity is adjusted.

When the rear dial 13 is rotated under the condition where the first sensitivity setting picture corresponding to the first sensitivity setting state is displayed on the first display 92a, the upper limited value of the range of the sensitivity is adjusted.

When the direction keys 16 are operated under the condition where the sensitivity setting picture corresponding to the first sensitivity setting state is displayed on the first display 92a, a switching operation between an indication of the first sensitivity setting picture (see FIGS. 5 and 6), corresponding to the first sensitivity setting state, and an indication of a second sensitivity setting picture (see FIG. 7), corresponding to the second sensitivity setting state, are performed, or the fixed value of the sensitivity in the second sensitivity setting state is adjusted.

Figure 6:
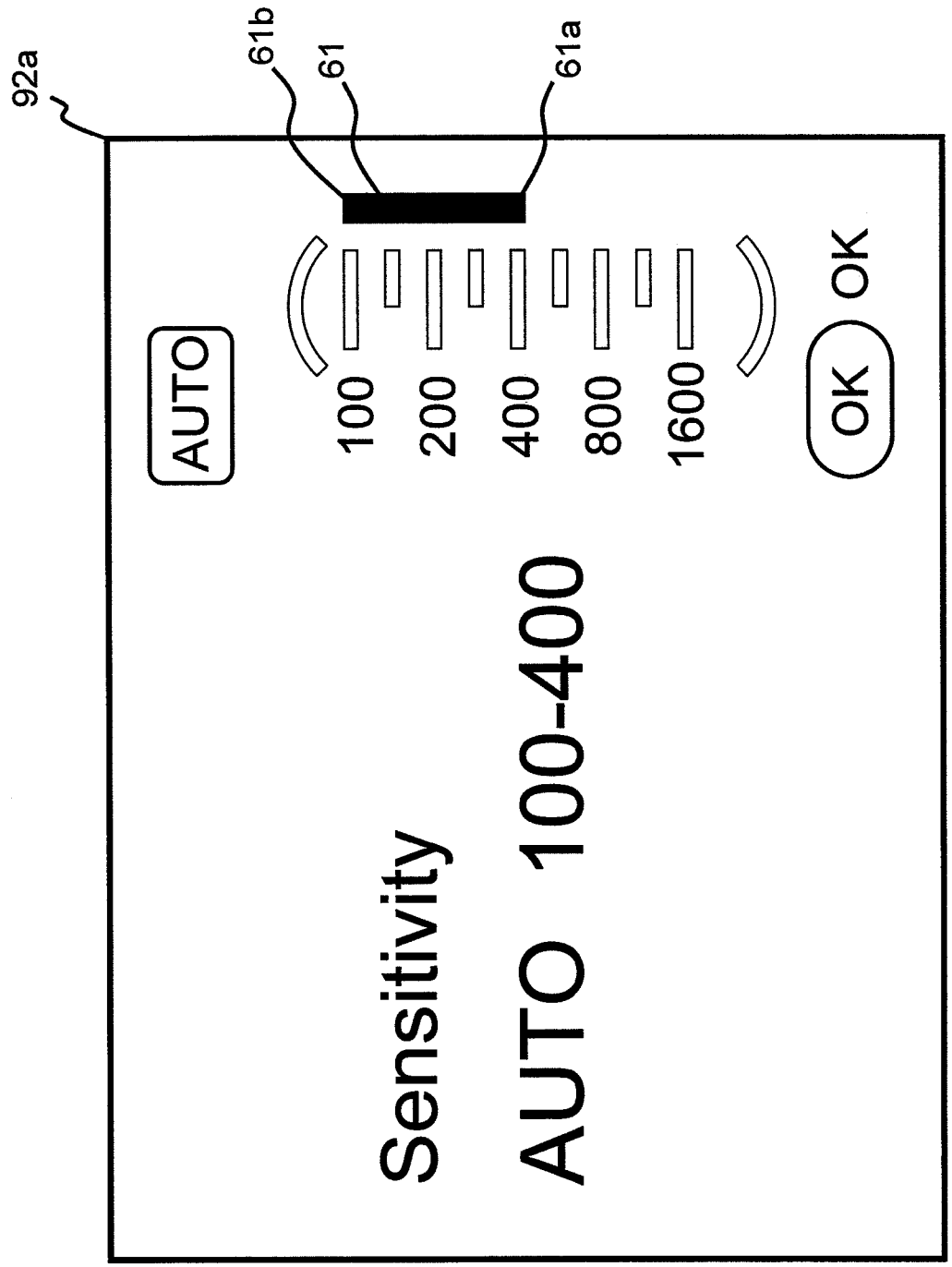
FIG. 6 shows display content that is displayed on the first display after the upper limited value of the range of the sensitivity is decreased.

The first sensitivity setting picture, in the first sensitivity setting state, indicates the range of the sensitivity of the imaging sensor 53 with a letter (a numerical value) and a range indication bar 61 corresponding to the range of the sensitivity, and displays a rectangle that has a space inside and surrounds the "AUTO" mark, as a mark that indicates the first sensitivity setting state (see FIGS. 5 and 6).

The range indication bar 61 has a first end part (a lower end part) 61a and a second end part (an upper end part) 61b. The first end part 61a moves in an up/down direction corresponding to the upper limited value of the range of the sensitivity that is changed by operating the rear dial 13. The second end part 61b moves in the up/down direction corresponding to the lower limited value of the range of the sensitivity that is changed by operating the front dial 12. The rectangle between the first part 61a and the second end part 61b, that forms the range indication bar 61, moves and stretches.

Therefore, the size of the range of the sensitivity can be instantly visually recognized from the letter and the range indication bar 61.

FIGS. 5 and 6 show that the upper limited value of the range of the sensitivity is changed from ISO560 to ISO400.

When the direction keys 16 are operated in the first sensitivity setting state, the sensitivity setting state of the photographing apparatus 1 is changed to the second sensitivity setting state from the first sensitivity setting state, so that the image on the first display 92a is changed from the first sensitivity setting picture corresponding to the first sensitivity setting state to the second sensitivity setting picture corresponding to the second sensitivity setting state (see FIG. 7).

When the up key of the direction keys 16 is operated in the first sensitivity setting state, the image on the first display 92a is changed from the first sensitivity setting picture to the second sensitivity setting picture, under the condition where a value of the upper limited value of the range of the sensitivity is set as the sensitivity in the second sensitivity setting state (the cursor is located at a position corresponding to the upper limited value of the range of the sensitivity).

When the down key of the direction keys 16 is operated in the first sensitivity setting state, the image on the first display 92a is changed from the first sensitivity setting picture to the second sensitivity setting picture, under the condition where a value of the lower limited value of the range of the sensitivity is set as the sensitivity in the second sensitivity setting state (the cursor is located at a position corresponding to the lower limited value of the range of the sensitivity).

For example, when the down key of the direction keys 16 is depressed in the first sensitivity setting state shown in FIG. 6, the sensitivity setting state of the photographing apparatus 1 is changed to the second sensitivity setting state shown in FIG. 7.

In the embodiment, the range indication bar 61 stretches in the up/down direction (in a vertical direction); however, it may also stretch in a right/left direction (a horizontal direction).

The second sensitivity setting picture in the second sensitivity setting state, indicates the sensitivity of the imaging sensor 53 with a letter (a numerical value) and a rectangular-shaped point 62 corresponding to the sensitivity (a cursor) (see FIG. 7).

The rectangular-shaped point (cursor) 62 corresponding to the sensitivity moves in the up/down direction corresponding to the sensitivity, as it is changed by operating the up key or the down key of the direction keys 16.

Because the rectangular-shaped point 62 does not stretch like the range indication bar 61 in the first sensitivity setting state, the difference between the first sensitivity setting state and the second sensitivity setting state can be instantly visually recognized.

Further, the second sensitivity setting picture in the second sensitivity setting state, displays the "AUTO" mark; however, it does not display the rectangle that has the space inside and surrounds the "AUTO" mark.

When the rectangular-shaped point 62 is moved to the "AUTO" mark in the second sensitivity setting picture in the second sensitivity setting state, by operating the up key or the down key of the direction keys 16, the sensitivity setting state of the photographing apparatus 1 is changed to the first sensitivity setting state from the second sensitivity setting state, so that the image on the first display 92a is changed from the second sensitivity setting picture, corresponding to the second sensitivity setting state, to the first sensitivity setting picture, corresponding to the first sensitivity setting state (see FIGS. 5 and 6).

In the embodiment, because the range of the sensitivity can be adjusted by rotating the front dial 12 and the rear dial 13 while observing the range indication bar 61 illustrated (displayed) in the first sensitivity setting picture, it becomes easy to visually recognize and set the range of the sensitivity.

Further, the range indication bar 61 is used for indicating the range of the sensitivity, however, another indication style such as a circle graph may also be used.

Figure 4:
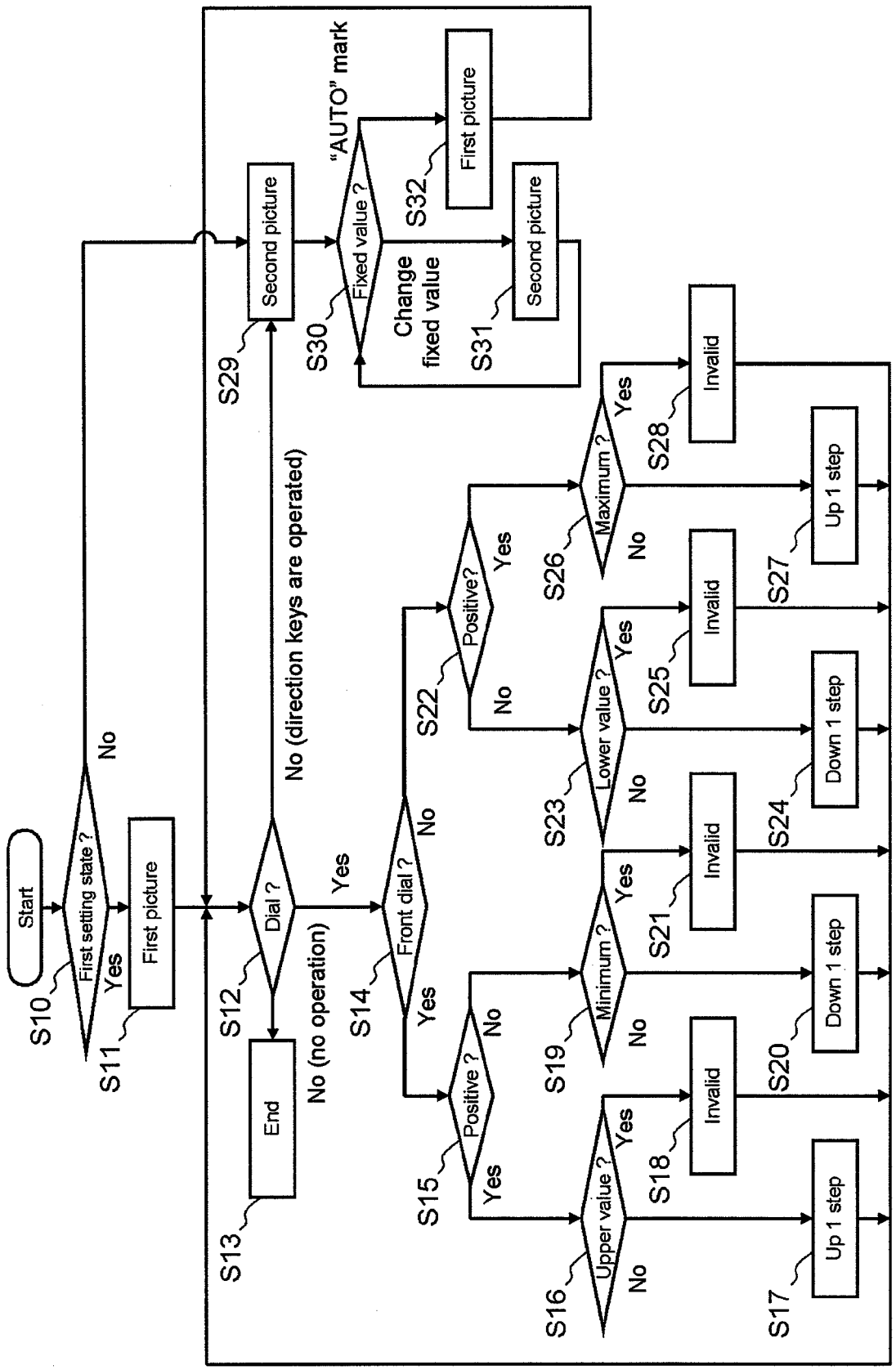
FIG. 4 is a flowchart that indicates the process whereby the upper limited value of the range of the sensitivity, the lower limited value of the range of the sensitivity, and the sensitivity are set.

Next, the process whereby the upper limited value of the range of the sensitivity in the first sensitivity setting state, the lower limited value of the range of the sensitivity in the first sensitivity setting state, and the sensitivity in the second sensitivity setting state, are set is explained by using a flowchart in FIG. 4.

When an operation that causes the first sensitivity setting picture or the second sensitivity setting picture to be shown on the first display 92a is performed by operating the function key 15, the direction keys 16, and the decision key 17, it is determined whether the sensitivity setting state of the photographing apparatus 1 is set to the first sensitivity setting state in step S10.

When it is determined that the sensitivity setting state of the photographing apparatus 1 is set to the first sensitivity setting state, the operation continues to step S11. Otherwise (When it is determined that the sensitivity setting state of the photographing apparatus 1 is set to the second sensitivity setting state), the operation proceeds directly to step S29.

When setting the sensitivity is previously performed, so that the calculation of the sensitivity based on the luminance value obtained in the photometric operation is selected; in other words, the range of the sensitivity is manually set, the sensitivity setting state of the photographing apparatus 1 is set to the first sensitivity setting state.

When setting the sensitivity is previously performed so that the sensitivity is manually set, regardless of the luminance value obtained in the photometric operation, the sensitivity setting state of the photographing apparatus 1 is set to the second sensitivity setting state.

In step S11, the first display 92a displays the first sensitivity setting picture corresponding to the first sensitivity setting state, as used for setting the upper limited value of the range of the sensitivity and the lower limited value of the range of the sensitivity.

In step S12, it is determined whether the front dial 12 or the rear dial 13 is rotated. When both the front dial 12 and the rear dial 13, and the direction keys 16 are not operated for a predetermined length of time, or when the decision key 17 is operated, setting the sensitivity is finished in step S13.

When at least one of the front dial 12 and the rear dial 13 is rotated, it is determined that the sensitivity setting state of the photographing apparatus 1 is set to the first sensitivity setting state, so the operation proceeds directly to step S14.

When both the front dial 12 and the rear dial 13 are not rotated, and when at least one of the direction keys 16 is operated, it is determined that the sensitivity setting state of the photographing apparatus 1 is set to the second sensitivity setting state, so the operation proceeds directly to step S29.

In step S14, it is determined whether the front dial 12 is rotated. When it is determined that the front dial 12 is rotated, it is determined that the lower limited value of the range of the sensitivity is adjusted, so the operation continues to step S15. Otherwise, it is determined that the upper limited value of the range of the sensitivity is adjusted, so the operation proceeds directly to step 22.

In step S15, it is determined whether the front dial 12 is rotated in the positive direction. When it is determined that the front dial 12 is rotated in the positive direction, it is determined that the lower limited value of the range of the sensitivity is decreased, so the operation continues to step S16. Otherwise, it is determined that the lower limited value of the range of the sensitivity is increased, so the operation proceeds directly to step S19.

In step S16, if the front dial 12 is rotated in the positive direction so that the lower limited value of the range of the sensitivity is increased, it is determined whether the lower limited value of the range of the sensitivity becomes the same as the upper limited value of the range of the sensitivity at the point in time before the front dial 12 is rotated.

When it is determined that the lower limited value of the range of the sensitivity does not become the same as the upper limited value of the range of the sensitivity, the operation continues to step S17. Otherwise, the operation proceeds directly to step S18.

In step S17, the lower limited value of the range of the sensitivity is increased 1 step, so the operation returns to step S12, and the length of the range indication bar 61 on the first sensitivity setting picture displayed on the first display 92a is shortened by 1 step.

In step S18, the operation of the lower limited value of the range of the sensitivity being increased is not performed; in other words, the operation of the front dial 12 in the positive direction is invalidated, so the operation returns to step S12.

In step S19, it is determined whether the lower limited value of the range of the sensitivity, at the point in time before the front dial 12 is rotated in the negative direction, is the same as the minimum value of the sensitivity that can be set.

When it is determined that the lower limited value of the range of the sensitivity, at the point in time before the front dial 12 is rotated in the negative direction, is not the same as the minimum value of the sensitivity that can be set, the operation continues to step S20. Otherwise, the operation proceeds directly to step S21.

In step S20, the lower limited value of the range of the sensitivity is decreased 1 step, so the operation returns to step S12, and the length of the range indication bar 61 on the first sensitivity setting picture displayed on the first display 92a is lengthened by 1 step.

In step S21, the operation of the lower limited value of the range of the sensitivity being decreased is not performed; in other words, the operation of the front dial 12 in the negative direction is invalidated, so the operation returns to step S12.

In step S22, it is determined whether the rear dial 13 is rotated in the positive direction. When it is determined that the rear dial 13 is rotated in the negative direction, it is determined that the upper limited value of the range of the sensitivity is decreased, so the operation continues to step S23. Otherwise, it is determined that the upper limited value of the range of the sensitivity is increased, so the operation proceeds directly to step S26.

In step S23, if the rear dial 13 is rotated in the negative direction so that the upper limited value of the range of the sensitivity is decreased, it is determined whether the upper limited value of the range of the sensitivity becomes the same as the lower limited value of the range of the sensitivity at the point in time before the rear dial 13 is rotated.

When it is determined that the upper limited value of the range of the sensitivity does not become the same as the lower limited value of the range of the sensitivity, the operation continues to step S24. Otherwise, the operation proceeds directly to step S25.

In step S24, the upper limited value of the range of the sensitivity is decreased 1 step, so the operation returns to step S12, and the length of the range indication bar 61 on the first sensitivity setting picture displayed on the first display 92a is shortened by 1 step.

In step S25, the operation of the upper limited value of the range of the sensitivity being decreased is not performed; in other words, the operation of the rear dial 13 in the negative direction is invalidated, so the operation returns to step S12.

In step S26, it is determined whether the upper limited value of the range of the sensitivity, at the point in time before the rear dial 13 is rotated in the positive direction, is the same as the maximum value of the sensitivity that can be set.

When it is determined that the upper limited value of the range of the sensitivity, at the point in time before the rear dial 13 is rotated in the positive direction, is not the same as the maximum value of the sensitivity that can be set, the operation continues to step S27. Otherwise, the operation proceeds directly to step S28.

In step S27, the upper limited value of the range of the sensitivity is increased 1 step, so the operation returns to step S12, and the length of the range indication bar 61 on the first sensitivity setting picture displayed on the first display 92a is lengthened by 1 step.

In step S28, the operation of the upper limited value of the range of the sensitivity being increased is not performed; in other words, the operation of the rear dial 13 in the positive direction is invalidated, so the operation returns to step S12.

In step S29, the second sensitivity setting picture corresponding to the second sensitivity setting state, as used for setting and fixing the sensitivity, is displayed on the first display 92a.

When the up key of the direction keys 16 is operated in the first sensitivity setting state, the image on the first display 92a is changed from the first sensitivity setting picture to the second sensitivity setting picture under the condition where the value of the upper limited value of the range of the sensitivity is set as the sensitivity in the second sensitivity setting state (the cursor is located at a position corresponding to the upper limited value of the range of the sensitivity).

When the down key of the direction keys 16 is operated in the first sensitivity setting state, the image on the first display 92a is changed from the first sensitivity setting picture to the second sensitivity setting picture under the condition where the value of the lower limited value of the range of the sensitivity is set as the sensitivity in the second sensitivity setting state (the cursor is located at a position corresponding to the lower limited value of the range of the sensitivity).

Then, the sensitivity in the second sensitivity setting state is changed by depressing the up key or the down key.

In step S30, it is determined whether at least one of the up key and the down key of the direction keys 16 is operated so that the cursor (the rectangular-shaped point 62) is moved within the range of fixed values in the second sensitivity setting picture.

When it is determined that the cursor is moved within the range of fixed values in the second sensitivity setting picture, the sensitivity is changed corresponding to the position of the cursor. In step S31, the changed value is set as the sensitivity, the second sensitivity setting picture corresponding to the second sensitivity setting state is displayed on the first display 92a again, and the operation returns to step S30.

When it is determined that the cursor is moved out of the range of fixed values in the second sensitivity setting picture and moved to the area where the "AUTO" mark is indicated, the operation proceeds directly to step S32. In step S32, the sensitivity setting state of the photographing apparatus 1 is changed to the first sensitivity setting state from the second sensitivity setting state, so that the image on the first display 92a is changed from the second sensitivity setting picture corresponding to the second sensitivity setting state to the first sensitivity setting picture corresponding to the first sensitivity setting state, and the operation returns to step S12.

In the second sensitivity setting state, the sensitivity of the imaging sensor 53 may be set to a value in the full range of the sensitivity of the imaging sensor 53, and may be set to a value in the limited range of the sensitivity of the imaging sensor 53 that is set in the first sensitivity setting state.

In the embodiment, the upper limited value of the range of the sensitivity and the lower limited value of the range of the sensitivity are adjusted. However, this adjustment of the upper limited value of a range and the lower limited value of a range is not limited to the range of the sensitivity of the imaging sensor 53, but may also be used for another range of numerical values, such as the shutter speed, aperture value, etc., which are exposure conditions calculated in an exposure condition calculation of the photometric operation.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-247781 (filed on Sep. 13, 2006), which is expressly incorporated herein by reference, in its entirety.

The invention claimed is:

1. A photographing apparatus comprising:
an operation unit that has a range setter that is used for setting an upper limited value of a range of a sensitivity of an imaging sensor and a lower limited value of said range in a first sensitivity setting state where said sensitivity is calculated on the basis of a luminance value obtained in a photometric operation;
a controller that sets said upper limited value and said lower limited value corresponding to an operation of said range setter; and
a display that displays an indication of said upper limited value and said lower limited value that are set by said controller, wherein
said operation unit comprises an operation key that is used for switching between said first sensitivity setting state and a second sensitivity setting state, where said sensitivity is set regardless of said luminance value, said operation key comprises a first key and a second key;
when said first key is operated in said first sensitivity setting state, said first sensitivity setting state is changed to said second sensitivity setting state under a condition where a value of said upper limited value is set as said sensitivity in said second sensitivity setting state; and
when said second key is operated in said first sensitivity setting state, said first sensitivity setting state is changed to said second sensitivity setting state under a condition where a value of said lower limited value is set as said sensitivity in said second sensitivity setting state; and
said operation key is used for setting said sensitivity in said second sensitivity setting state.

2. The photographing apparatus according to claim 1, wherein said indication comprises displaying a range indication bar that has a first end part and a second end part, and that forms a rectangle between said first end part and second end part, said first end part moving in correspondence with said upper limited value, said second end part moving in correspondence with said lower limited value, and said rectangle moving and stretching in correspondence with said upper limited value and said lower limited value.

3. The photographing apparatus according to claim 1, wherein in the case that said lower limited value that is increased corresponding to an increasing operation of said range setter, is greater than said upper limited value at a point in time before said increasing operation, said increasing operation is invalidated by said controller.

4. The photographing apparatus according to claim 1, wherein in the case that said upper limited value that is decreased corresponding to a decreasing operation of said range setter, is less than said lower limited value at a point in time before said decreasing operation, said decreasing operation is invalidated by said controller.

5. The photographing apparatus according to claim 1, wherein said range setter has a first dial that sets said lower limited value and a second dial that sets said upper limited value.

6. The photographing apparatus according to claim 5, wherein said first dial is positioned on a front surface of said photographing apparatus, and said second dial is arranged on a rear surface of said photographing apparatus.

7. The photographing apparatus according to claim 1, wherein when said operation key is operated so that a cursor is moved out of a range of setting of said sensitivity in said second sensitivity setting state, said second sensitivity setting state is changed to said first sensitivity setting state.

* * * * *